(12) United States Patent
Dawson et al.

(10) Patent No.: US 11,539,129 B1
(45) Date of Patent: Dec. 27, 2022

(54) ELECTRONICALLY STEERABLE PARASITIC ARRAY RADIATOR ANTENNA

(71) Applicant: Naval Information Warfare Center Pacific, San Diego, CA (US)

(72) Inventors: David Carlos Dawson, Lemon Grove, CA (US); Ricardo Santoyo-Mejia, Chula Vista, CA (US); Ronald B Thompson, San Diego, CA (US); Jaime E Radulovich, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/375,804

(22) Filed: Jul. 14, 2021

(51) Int. Cl.
| | |
|---|---|
| *H01Q 3/26* | (2006.01) |
| *G01S 19/21* | (2010.01) |
| *H01Q 5/385* | (2015.01) |
| *H01Q 3/44* | (2006.01) |
| *H01Q 3/34* | (2006.01) |

(52) U.S. Cl.
CPC ............ *H01Q 3/2611* (2013.01); *G01S 19/21* (2013.01); *H01Q 3/2641* (2013.01); *H01Q 3/446* (2013.01); *H01Q 5/385* (2015.01); *H01Q 3/34* (2013.01)

(58) Field of Classification Search
None
See application file for complete search history.

(56) References Cited

U.S. PATENT DOCUMENTS

| | | | | | |
|---|---|---|---|---|---|
| 4,700,197 | A | * | 10/1987 | Milne | H01Q 3/446 343/837 |
| 5,952,968 | A | * | 9/1999 | McDowell | G01S 19/36 342/383 |
| 5,955,987 | A | * | 9/1999 | Murphy | G01S 19/36 342/357.29 |
| 6,961,017 | B1 | * | 11/2005 | Naylor | H04K 3/90 342/357.29 |
| 9,219,308 | B2 | * | 12/2015 | Ali | H01Q 19/30 |
| 2003/0156061 | A1 | * | 8/2003 | Ohira | H01Q 3/24 342/383 |

(Continued)

OTHER PUBLICATIONS

Chen et al. "Fast Beamforming of Electronically Steerable Parasitic Array Radiator Antennas: Theory and Experiment." IEEE Trans. on Antennas and Propagation. vol. 52, No. 7. Jul. 2004. pp 1819-1832. (Year: 2004).*

*Primary Examiner* — Gregory C. Issing
(74) *Attorney, Agent, or Firm* — Naval Information Warfare Center, Pacific; Kyle Eppele; Matthew D. Pangallo

(57) ABSTRACT

An electronically steerable parasitic array radiator (ESPAR) antenna system that includes an ESPAR antenna, a GPS receiver, a GPS low-noise amplifier, a power detector module, and a central processing unit. The GPS receiver is connected to the ESPAR antenna as a separate component. The GPS low-noise amplifier strengthens a signal to propagate through the transmission line and operates in the L1 and L2 GPS bands. The power detector module provides additional amplification for noise quantification. The power detector receives an RF power level and converts the RF power level into a DC voltage output. The central processing unit includes memory that is capable of storing the DC voltage output from the power detector.

14 Claims, 2 Drawing Sheets

(56) References Cited

U.S. PATENT DOCUMENTS

| | | | | |
|---|---|---|---|---|
| 2006/0252391 A1* | 11/2006 | Poilasne | ................. | H01Q 3/44 |
| | | | | 455/121 |
| 2019/0302271 A1* | 10/2019 | Panther | ............... | H01Q 9/0435 |
| 2020/0049833 A1* | 2/2020 | Drummer | .............. | G01S 19/36 |

* cited by examiner

ELECTRONICALLY STEERABLE PARASITIC ARRAY RADIATOR ANTENNA

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Beamforming antennas use an array of parasitic or quasi-antenna elements to modify the directionality of a signal transmitted by a central antenna, in both transmission and reception. The directionality of a beamforming antenna may be controlled by modifying the phase and relative amplitude, or even blockage of the signal using parasitic elements. By modifying the phase and amplitude of each individual element, a beam or a null can be created and modified. In some techniques, beam steering can be achieved by modifying the signal phase in real time without moving the antenna elements or other antenna hardware. Beamforming is used in many applications, such as radar, sonar, seismology, wireless communications, radio astronomy, acoustics, and biomedicine.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Nullforming or beamforming antennas can have many different architectures. In particular, aerial beamforming antennas have a design advantage over other antenna architectures because these antennas only require input from a single antenna while some other architectures require multiple antennas to properly function. However, aerial beamforming antennas cannot have parallel processing for beamforming. Therefore, using an aerial beamforming antenna to locate and place a null in the direction of a jammer or ambient RF jamming noise requires less components compared to other conventional antennas.

An electronically steerable parasitic array radiator (ESPAR) antenna system is used herein that is capable of locating and placing a null in the direction of one or more jammers or ambient RF jamming noise in milliseconds. The ESPAR antenna system includes a power detector that is capable of converting RF power levels from a low-noise amplifier to DC voltage outputs in picoseconds. A central processing unit records and saves the DC voltage outputs in memory and uses the DC voltage outputs to determine if a RF jammer or ambient RF jamming noise is present in a specific direction. If there is a RF jammer or ambient RF jamming noise, the central processing unit can direct the ESPAR antenna to place a null in the direction of the RF jammer or ambient RF jamming noise. This ESPAR system can place a null in the direction of the jammer or ambient jamming noise in milliseconds. Currently, there is no ESPAR nullforming or beamforming antennas capable of nullifying a RF jammer in milliseconds.

The ESPAR antenna system herein includes an ESPAR antenna, a GPS receiver, a GPS low-noise amplifier, a power detector module, a power detector, and a central processing unit. The GPS receiver is connected to the ESPAR antenna as a separate component. The GPS low-noise amplifier strengthens a signal to propagate through the transmission line and operates in the L1 and L2 GPS bands. The power detector module provides additional amplification for noise quantification. The power detector receives an RF power level and converts the RF power level into a DC voltage output. The central processing unit includes memory that is capable of storing the DC voltage output from the power detector.

Figure 1:
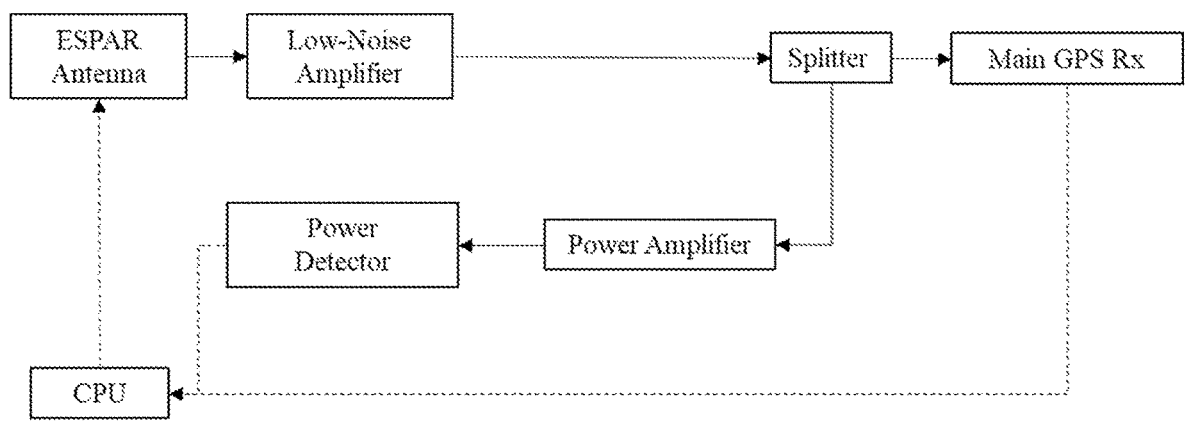
FIG. 1 is an example of the architecture of the ESPAR antenna system described herein.

Referring now to FIG. 1, the ESPAR antenna system includes an ESPAR antenna. The ESPAR antenna may be any GPS ESPAR antenna. In an example, the ESPAR antenna is shown in FIG. 1 as "ESPAR antenna". In the example shown in FIG. 1, the solid arrows indicate the RF lines and dashed arrows indicate the control lines. The ESPAR antenna is designed for GPS receivers. The ESPAR antenna also includes an array of parasitic elements. The parasitic elements are used to modify the shape of the radiation pattern, in order to find the source of the jamming RF noise. The ESPAR antenna is steerable in a 360° direction in azimuth, which allows the ESPAR antenna to find the source of the jamming RF noise in any direction. The rotation of the ESPAR antenna radiation pattern is accomplished with an array of parasitic elements with (360/the array of parasitic elements)° of rotational freedom. In an example, the array of parasitic elements may be as many parasitic elements that can physically fit within the ESPAR antenna without producing mutual impedance that causes a loss of control, where the higher the number of parasitic elements, the more accuracy the ESPAR antenna has in identifying the spatial direction of RF noise. In another example, the array of parasitic elements is 10, and the ESPAR antenna has 36° of rotational freedom.

Referring to FIG. 1, the ESPAR antenna system uses the GPS receiver as part of the system. The GPS receiver is connected as a separate component from the ESPAR antenna, as shown in the example in FIG. 1 as the "Main GPS Rx". The GPS receiver may operate in any mode of operation. For example, the receivers may operate in differential GPS (DGPS) mode or real-time kinematic (RTK) GPS mode. If a combination of GPS receivers are used, the ESPAR antenna output can use a splitter or multiple splitters to feed additional receivers. In some examples, the ESPAR antenna only receives signals. In other examples, the ESPAR antenna sends and receives signals. As shown in the example in FIG. 2, two splitters are used to split the signal from the low-noise amplifier to the power detector and auxiliary GPS.

Referring back to FIG. 1, the ESPAR antenna system also includes a GPS low-noise amplifier connected directly to the ESPAR antenna. Any signal from the ESPAR antenna passes through the GPS low-noise amplifier to the GPS receiver. This is depicted in FIG. 1 as "Low-Noise Amplifier". The GPS low-noise amplifier amplifies the RF signal from the ESPAR antenna to an appropriate level to withstand the loss of signal from the cable between the antenna and the main GPS receiver. In addition, the GPS low-noise amplifier operates in the L1 and L2 GPS bands. The GPS low-noise amplifier may be any low-noise amplifier capable of amplifying the RF signal to the level required in each scenario.

Referring back to FIG. 1, the ESPAR antenna system includes a power detector module. After splitting the RF signal into two branches using a splitter, the ESPAR antenna system uses the power detector module to amplify the RF signal so the subsequent power detector can provide noise quantification. The power detector module strengthens the RF signal to sufficient level that the power detector can detect and assign a value. In an example, the power detector module increases the noise level halfway between the minimum and maximum limits of the power detector range of operation. In some examples, the ESPAR antenna system may include two power detector modules connected in-series to achieve this level. In other examples, the ESPAR antenna system may include three or more power detector modules connected in-series. The power detector module or series of power detector modules are connected as a separate component of the power detector. The power detector module or series of power detector modules may be any power detector module or series of power detector modules that operate in the L1 GPS band and are capable of amplifying the RF signal to the required level to provide noise quantification. An example of these power detector modules includes commercially available GPS low-noise amplifiers operating in the L1 GPS band.

Referring back to FIG. 1, the ESPAR antenna system includes a power detector. The example of the power detector is shown in FIG. 1 as "Power Detector". The power detector receives different RF power levels (i.e., the RF signal) from each position via the main low-noise amplifier. The power detector module increases the RF power levels for the power detector to detect and then convert the RF signals into DC voltage outputs. The DC voltage outputs are compared the strongest power level is selected to place a null in the direction associated with that power level. In some examples, the power detector is capable of reading the RF power level in picoseconds. The power detector may be any power detector that, when paired with a low-noise amplifier, one or more power detector modules, or a combination thereof receives a RF signal with sufficient amplification to convert the RF signal to a DC voltage output. An example includes a power detector with a sensitivity of −40 dB.

Referring back to FIG. 1, the ESPAR antenna system includes a central processing unit. The central processing unit is shown in FIG. 1 as "CPU". The central processing unit includes memory that is capable of storing the DC voltage output from the power detector. Some examples of the central processing unit may be field programmable gate arrays, application specific integrated circuits, and commercial off-the-shelf computers. The central processing unit also directs the ESPAR antenna to search for a jammer by projecting nulls in a 360° direction in azimuth. In some examples, the central processing unit directs the ESPAR antenna to search for two or more sources of RF jamming noise by projecting two or more nulls in a 360° in azimuth. Some examples that the RF jamming noise is generated from may be a jammer, ambient interfering RF noise, or a combination thereof. In an example, the central processing unit directs the ESPAR antenna to locate the direction of arrival of a jammer in a time equal to or less than 500 picoseconds.

In addition, the central processing unit includes software that determines a direction of the RF jamming noise by comparing DC voltage outputs provided by the power detector. The software is able to compare all of the DC voltage outputs provided by the detector 360° in the azimuth. The software determines which direction or directions have a DC voltage output that require a null to be placed in that direction. Some examples of how the central processing unit determines when the DC voltage output indicates RF jamming noise are discussed below.

In one example, the central processing unit directs the ESPAR antenna to search for an RF jamming noise by directing the ESPAR antenna to scan 360° in azimuth, recording a noise level 360° in azimuth as the DC voltage output, and placing a null in a direction of a highest DC voltage output value. The DC voltage output values of each position are stored in the memory of the central processing unit. Once all of the DC voltage output values 360° in the azimuth are obtained, the central processing unit compares all of the DC voltage output values. The highest DC voltage output value indicates the direction of the jammer and a null is placed in that direction. The lowest DC voltage output value indicates the position the ESPAR antenna needs to maintain to prevent the receiver from being jammed. The central processing unit and ESPAR antenna would be continuously determining where to place a null when the ESPAR antenna is part of a fast moving vehicle (e.g., a jet). In contrast, when the ESPAR antenna is part of a slow moving vehicle (e.g., a ship), the central processing unit and ESPAR antenna would not be continuously determining where to place a null. The bearing rate and relative motion between the ESPAR antenna and the vehicle containing the ESPAR antenna may also be used by the central processing unit to calculate if the central processing unit and ESPAR antenna need to continuously determine where to place nulls.

In another example, the central processing unit directs the ESPAR antenna to search for an RF jamming noise 360° in the azimuth when the DC voltage output is greater than the calculated noise floor level value. The noise floor level value is determined by having the ESPAR antenna conduct a 360° rotation in azimuth. Then, the central processing unit records the noise level value 360° in the azimuth as the DC voltage output levels. The central processing unit then calculates the average noise level value as a DC voltage output using every reading 360° in the azimuth. The average noise level value is then used as the noise floor level value. Whenever the DC voltage output corresponds to a noise level that is greater than the average noise level, the ESPAR antenna places a null in the direction that the DC voltage output was greater than the average noise level value. Similar to above, the central processing unit and ESPAR antenna would be continuously determining the noise floor level value when the ESPAR antenna is part of a fast moving vehicle (e.g., a jet). In contrast, when the ESPAR antenna is part of a slow moving vehicle (e.g., a ship), the central processing unit and ESPAR antenna would not be continuously determining the noise floor level value. The bearing rate and relative motion between the ESPAR antenna and a jammer may also be used by the central processing unit to calculate if the central processing unit and ESPAR antenna need to continuously determine the noise floor level value.

In another example, the central processing unit directs the ESPAR antenna to search for an RF jamming noise 360° in the azimuth when the DC voltage output of the power detector corresponds to a noise level greater than the noise floor level value that is a predetermined value preprogrammed into the central processing unit. In this example, the ESPAR antenna scans 360° in the azimuth. Whenever the DC voltage output corresponds to a noise level that is greater than the preprogrammed noise floor level value stored in the central processing unit, the ESPAR antenna detects that there is jamming and then places a null in the direction that the DC voltage output is greater than the preprogrammed noise floor level value. In another example, when the DC voltage output corresponds to a noise level that is greater than the preprogrammed noise floor level value stored in the central processing unit in multiple directions the ESPAR antenna will attempt to place a null in the directions with the highest voltage outputs (i.e., the largest noise level).

In some examples, the ESPAR antenna system further includes additional splitters, an attenuator, a bandpass filter, or a combination thereof. In other examples, the ESPAR antenna system consists of the ESPAR antenna, at least one low-noise amplifier, the power detector, a power detector module, and a central processing unit. In examples where the splitter, the attenuator, the bandpass filter, or a combination thereof are used, the additional splitter, the attenuator, the bandpass filter, or a combination thereof have to function at GPS frequencies when used in the EPSAR antenna system.

Figure 2:
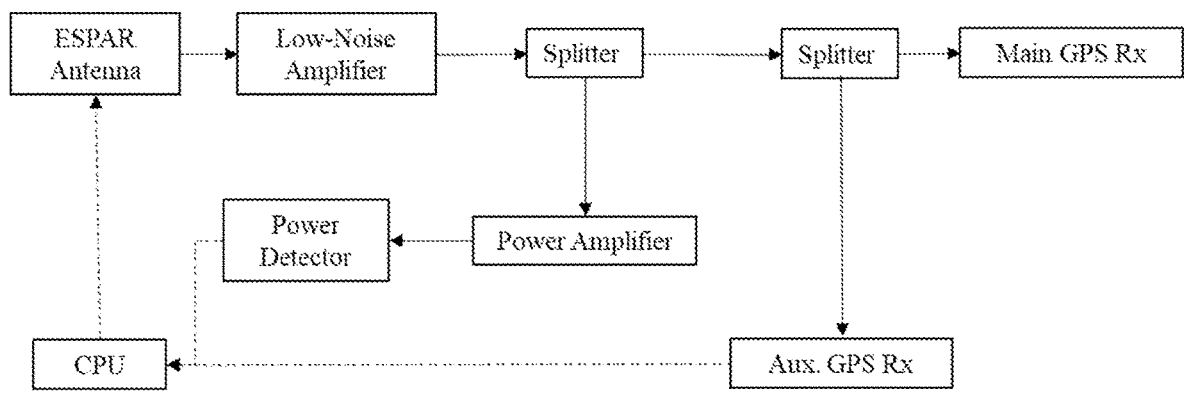
FIG. 2 is another example of the architecture of the ESPAR antenna system described herein.

Another example of the ESPAR antenna assembly is shown in FIG. 2. The ESPAR antenna includes the same components previously discussed herein for FIG. 1, but also includes an additional splitter and an auxiliary GPS receiver embedded within the ESPAR antenna. The additional splitter divides the signal so both the GPS receiver and the auxiliary GPS receiver are able to receive the signal. The purpose of this auxiliary GPS receiver is to act as a sentinel, warning the ESPAR antenna system of a jammer in the vicinity. This allows the ESPAR antenna to rapidly adjust by applying a null in the direction of the jammer, thereby reducing the exposure of the main GPS receiver to jamming. The auxiliary GPS receiver may be any GPS receiver operating in the L1 band. In some examples, the auxiliary GPS receiver is an inexpensive GPS receiver that may be blocked by jamming while the main GPS receiver is able to operate.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about −120 dB to about −40 dB should be interpreted to include not only the explicitly recited limits of from about −120 dB to about −40 dB, but also to include individual values, such as −105 dB, −75 dB, −55.5 dB, etc., and sub-ranges, such as from about −85 dB to about −65 dB, etc.

In describing and claiming the examples disclosed herein, the singular forms "a", "an", and "the" include plural referents unless the context clearly dictates otherwise.

What is claimed is:

1. An electronically steerable parasitic array radiator (ESPAR) antenna system, comprising:
    an ESPAR antenna, wherein the ESPAR antenna is connected to the low-noise amplifier via a RF line;
    a GPS receiver, wherein the GPS receiver is connected to a GPS low-noise amplifier via the RF line and connected to a central processing unit via a control line;
    the GPS low-noise amplifier, wherein the GPS low-noise amplifier is connected to at least one splitter via the RF line that connects the GPS low-noise amplifier to the GPS receiver and a power detector module and operates in the L1 and L2 GPS bands;
    the power detector module, wherein the power detector module is connected to the low-noise amplifier via the RF line and providing amplification between minimum and maximum limits of a range of operation of a power detector
    the power detector, wherein the power detector is connected to the power detector module via the RF line and receives an RF power level from the power detector module and converts the RF power level into a DC voltage output; and
    a central processing unit, wherein the central processing unit is connected to the ESPAR antenna, power detector, and the GPS receiver via control lines and the central processing unit includes memory that is capable of storing the DC voltage output from the power detector and wherein the central processing unit uses the DC voltage output to determine a direction of RF jamming noise and directs the ESPAR antenna to place a null in the direction of the RF jamming noise, thereby nullifying the RF jammer.

2. The system of claim 1, wherein the ESPAR antenna has an array of parasitic elements with:
    a degree of rotational freedom=(360/a number of parasitic elements in the array of parasitic elements).

3. The system of claim 1, wherein the central processing unit directs the ESPAR antenna to search for a jammer by projecting nulls in a 360° direction in azimuth.

4. The system of claim 1, wherein the central processing unit is selected from a group consisting of field programmable gate arrays, application specific integrated circuits, and commercial off-the-shelf computers.

5. The system of claim 1, wherein the central processing unit is capable of directing the ESPAR antenna to place the null in the direction where the DC voltage output is greater than a noise floor level value that is preprogrammed in the central processing unit.

6. The system of claim 1, wherein the central processing unit is capable of directing the ESPAR antenna to place the null by directing the ESPAR antenna to scan 360° in azimuth, recording a noise level 360° in azimuth as the DC voltage output, and placing the null in the direction with a highest DC voltage output value.

7. The system of claim 1, wherein the ESPAR antenna only receives signals.

8. The system of claim 1, wherein the power detector has a sensitivity equal to or less than −40 dB.

9. The system of claim 1, wherein the ESPAR antenna projects two or more nulls at two or more sources of the RF jamming noise.

10. The system of claim 1, wherein a noise floor level value is determined by having the ESPAR antenna scan while performing a 360° rotation in the azimuth, having the central processing unit record the noise level value 360° in the azimuth as the DC voltage output during the scan, having the central processing unit calculate an average noise level value from every DC voltage output recorded during the scan, and using the average noise level value as the noise floor level value.

11. The system of claim 1, wherein the ESPAR antenna system further includes a splitter and an auxiliary GPS receiver embedded in the ESPAR antenna system.

12. The system of claim 11, wherein the auxiliary GPS receiver operates in the L1 GPS band.

13. The system of claim 1, wherein the central processing unit is capable of directing the ESPAR antenna to place a null in a direction where the DC voltage output is a highest amount above a noise floor level value that is preprogrammed in the central processing unit when there are multiple directions where the DC voltage output is greater than the noise floor level value that is preprogrammed in the central processing unit.

14. The system of claim 1, wherein the power detector module increases a noise level to an amount halfway between the minimum and maximum limits of a range of operation of the power detector.

\* \* \* \* \*